United States Patent [19]

Suzuki et al.

[11] 4,307,006

[45] Dec. 22, 1981

[54] LATEX OF VINYLIDENE CHLORIDE COPOLYMER

[75] Inventors: Masayasu Suzuki; Masaki Kobori, both of Iwaki, Japan

[73] Assignee: Kureha Kagaku Kogyo Kabushiki Kaisha, Tokyo, Japan

[21] Appl. No.: 188,833

[22] Filed: Sep. 19, 1980

[30] Foreign Application Priority Data

Sep. 28, 1979 [JP] Japan .................................. 54-125067

[51] Int. Cl.$^3$ ............................................. C08L 27/08
[52] U.S. Cl. ............................ 260/29.6 RB; 525/317; 525/902
[58] Field of Search ................... 260/29.6 RB, 29.6 T, 260/29.6 TA; 525/317, 902

[56] References Cited

U.S. PATENT DOCUMENTS

| | | | |
|---|---|---|---|
| 3,291,768 | 12/1966 | Pfluger | 525/902 |
| 3,291,769 | 12/1966 | Woodford | 525/317 |
| 3,309,330 | 3/1967 | Settlage | 260/29.6 TA |
| 3,379,665 | 4/1968 | Lyon | 260/29.6 RB |

Primary Examiner—Paul R. Michl
Attorney, Agent, or Firm—Wegner & Bretschneider

[57] ABSTRACT

A latex of vinylidene chloride copolymer particle which has a three-layered structure comprising 20 to 70 parts by weight of a core layer of vinylidene chloride copolymer containing 85 to 94% by weight of vinylidene chloride, 3 to 15 parts by weight of an intermediate layer of vinylidene chloride copolymer containing more than 94% by weight of vinylidene chloride and 20 to 70 parts by weight of an outer layer of vinylidene chloride copolymer containing 85 to 94% by weight of vinylidene chloride, the three layers amounting to 100 parts by weight.

5 Claims, 1 Drawing Figure

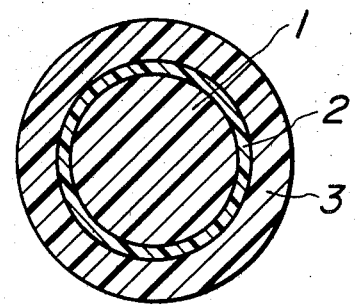

LATEX OF VINYLIDENE CHLORIDE COPOLYMER

This invention relates to a latex of vinylidene chloride copolymer having a three-layered structure.

Various plastic films coated with a latex comprising a vinylidene chloride copolymer have hitherto been used mainly in packing foods by utilizing their high gas-barrier property. In the above-mentioned food packing, heat-sealing is carried out usually between the two coated surfaces of vinylidene chloride copolymer, or in the case where a film consisting of poly-olefin such as polyethylene, ethylene copolymer and polypropylene is laminated onto a coated membrane of vinylidene chloride copolymer, heat-sealing is carried out between the poly-olefin laminates. After heat-sealing, the content is sealed hermetically. In addition, in the case where the content is easily putrefactive, the heat-sealed package is subjected to a boiling treatment, which is immersed immediately into hot water for sterilization. In such a case, since the boiling is carried out before the coated membrane of vinylidene chloride copolymer once melted by heat-sealing recrystallizes, the heat-sealed part absorbs water. Therefore, a water blushing by boiling frequently occurs at the heat-sealed part and impairs the appearance of the package and also the quality of the content to cause economic loss. For that reason, the range of application of the plastic film coated with the latex of vinylidene chloride copolymer has been limited.

In order to prevent the water blushing of the coated film, particularly the water blushing of the heat-sealed part of the coated film in the boiling treatment, it has been considered to accelerate the crystallization of the vinylidene chloride copolymer and to bring the crystallinity thereof sufficiently high between the heat-sealing and the boiling treatment.

For instance, one practical method based on the above-mentioned consideration is disclosed in Japanese Patent Publication No. 33113/74. According to the above-mentioned method, a monomer mixture of vinylidene chloride is polymerized in an emulsified state, in the presence of copolymer particles relatively rich in vinylidene chloride and capable of acting as a crystal nucleus, to form a latex particles. Each of the latex particles has at its center a core layer consisting of the copolymer particle relatively richer in vinylidene chloride, which has been present at the time of the above-mentioned step of polymerization, surrounded by a layer of another copolymer relatively poorer in vinylidene chloride formed by the above-mentioned step of polymerization. The thus obtained latex particle comprising two kinds of vinylidene chloride copolymers has a two-layer structure. The first layer, that is, the core layer of the particle consists of copolymer relatively richer in vinylidene chloride and is capable of self-crystallization and of inducing crystallization as the crystal nucleus. The second layer, that is, the outer layer of the particle consists of another copolymer relatively poorer in vinylidene chloride and is capable of receiving the induced action of the copolymer in the core layer and of easily crystallizing. Owing to the above-mentioned structure of the latex particles, the water blushing of the film coated with the above-mentioned latex at the time of boiling treatment after heat-sealing is effectively prevented.

However, in the case of coating the above-mentioned latex onto a plastic film such as made of polyethylene, polypropylene, etc., to form a coated film, the processability of the latex to prepare a smooth membrane on the plastic film without resulting cracks on the membrane has been not always favorable. The reason of such an unfavorable processability of the latex at coating has been attributed, by the inventors, to the too large ratio of the diameter of the core layer to the whole diameter of the particle. However, in the case where the particle of copolymer relatively rich in vinylidene chloride having a diameter not to cause the impairment of the processability of the latex is used as the core layer of the polymerization, the water blushing occurred frequently in boiling treatment after heat-sealing of the coated film.

After having arrived at the conclusion that it is very difficult to reconcile both the prevention of water blushing and the favorable processability by the above-mentioned method, the inventors considered to prepare a copolymer particle having a thin layer of a copolymer relatively richer in vinylidene chloride around a copolymer core of which the content of vinylidene chloride is relatively poorer. It is found that such a copolymer particle used as the latex is easily obtainable by polymerizing a monomer mixture of relatively richer in vinylidene chloride in an emulsified state in the presence of a latex particle of a copolymer relatively poorer in vinylidene chloride, that is, by forming a layer of newly polymerized copolymer relatively richer in vinylidene chloride around the latex particle of the copolymer relatively poorer in vinylidene chloride without forming new particles of the newly polymerized copolymer, just as is in the case of preparing polyvinyl chloride for use in pastes by the so-called seed polymerization and knowing that the thus prepared copolymer latex has the fairly favorable processability and the anti-blushing property in boiling treatment. And then, the inventors have proceeded further to prepare the latex particle of copolymer having a three-layered structure.

The present invention provides a latex of vinylidene chloride copolymer particle which has a three-layered structure, the structure being characterized in that a core layer consists of a copolymer containing 85 to 94% by weight of vinylidene chloride and 6 to 15% by weight of at least one monomer copolymerizable with vinylidene chloride, an intermediate layer consists of a copolymer containing 94 to 100% by weight of vinylidene chloride and 0 to 6% by weight of at least one monomer copolymerizable with vinylidene chloride, and an outer layer consists of a copolymer containing 85 to 94% by weight of vinylidene chloride and 6 to 15% by weight of at least one monomer copolymerizable with vinylidene chloride.

The latex of the present invention can be obtained according to the method which is characterized in that (1) 3 to 15 parts by weight of a monomer mixture consisting of 94 to 100% by weight of vinylidene chloride and 0 to 6% by weight of at least one monomer copolymerizable with vinylidene chloride is copolymerized in an emulsified state in the presence of a core layer comprising 20 to 70 parts by weight of a copolymer particle which consists of 85 to 94% by weight of vinylidene chloride and 6 to 15% by weight of at least one monomer copolymerizable with vinylidene chloride obtained by the emulsion polymerization to prepare an intermediate layer around the core layer of the particle and then (2) 20 to 70 parts by weight of another monomer mixture consisting of 85 to 94% by weight of vinylidene chloride and 6 to 15% by weight of at least one monomer copolymerizable with vinylidene chloride is copolymerized in an emulsified state to prepare an outer layer around the intermediate layer of the particle.

The latex according to this invention is processable favorably at a high-speed painting or coating while retaining its film-forming ability for a long life, and a film coated with the above-mentioned latex is excellent in anti-blushing property against boiling treatment at the heat-sealed part, in gas-barrier property and in anti-blocking property.

A cross section of the latex particle according to the present invention is schematically shown as a cross section in an attached drawing, wherein the part shown by (1) is the central layer of the latex particle and consists of a copolymer containing 85 to 94% by weight of vinylidene chloride, the part shown by (2) is the intermediate layer and consists of a copolymer containing more than 94% by weight of vinylidene chloride and acts as the crystal nucleus, and the part shown by (3) is the outer layer and consists of a copolymer containing 85 to 94% by weight of vinylidene chloride (hereinafter the central layer is referred to as the layer (1), the intermediate layer referred to as the layer (2) and the outermost layer referred to as the layer (3)).

The copolymer constituting the layer (2) and containing more than 94% of vinylidene chloride, which acts as a crystal nucleus occupies only 3 to 15 parts by weight of the whole particle, and accordingly, the copolymer forms a thin layer between the layer (1) and the layer (3). The thickness of the layer (2) naturally depends on the weights of the layers (1) and (2) and the total weight of the particle, and it is preferably 10 to $50 \times 10^{-8}$ cm, more preferably 15 to $40 \times 10^{-8}$ cm. It is easily obtained by calculation after knowing each weight of the copolymers of the three layers and the diameter of the latex particle.

As the thickness of the layer (2), which contains a relatively larger amount of vinylidene chloride, takes such a small value in spite of its amount sufficient as the crystal nucleus, the whole particle becomes soft and does not give any unfavorable effects to the processability of the latex. Accordingly, the layer (2) of the present invention can act sufficiently as the crystal nucleus without affecting the processability of the latex.

In the case where the weight of the layer (1) is smaller than 20 parts by weight of the total weight of the particle, the thickness of the layer (2) becomes larger to impair the processability of the latex. On the other hand, in the case where it is larger than 70 parts by weight of the total weight, the weight of the layer (3) becomes relatively smaller to be easily affected by the layer (2) resulting also in the poor processability of the latex. Accordingly, the weight of the layer (1) is preferably 30 to 65 parts by weight of the total weight of the particle.

In the case where the weight of the layer (2) is smaller than 3 parts by weight of the total weight of the particle, its effectiveness as the crystal nucleus becomes smaller and as a result, the heat-sealed part is easily blushed by boiling treatment after the heat-sealing. On the other hand, in the case where the weight of the layer (2) is larger than 15 parts by weight of the total weight, the thickness of the layer (2) is apt to increase causing unfavorable effect on the processability of the latex. The weight of the layer (2) is preferably 5 to 15 parts by weight of the total weight of the particle.

In the next place, in the case where the weight of the layer (3) is smaller than 20 parts by weight of the total weight of the particle, its thickness becomes smaller to be susceptible to the effect of the layer (2). In the case where it is larger than 70 parts by weight of the total weight of the particle, the film-forming property of the latex is retained and the processability of the latex is maintained, however, the anti-blocking property of the films prepared by coating is deteriorated. Accordingly, the weight of the layer (3) is preferably 30 to 65 parts by weight of the total weight of the particle.

Since the layer (2) is to act as the crystal nucleus, it is necessary that its content of vinylidene chloride is larger than 94% by weight, and those containing more than 95% by weight of vinylidene chloride are preferably used. The content of vinylidene chloride of the layers (1) and (3) is 85 to 94% by weight, and both the copolymers of the layers (1) and (3) may be the same or different in composition. However, in the case where the content of vinylidene chloride is below 85% by weight in both the layers (1) and (3), the gas-barrier property of the film coated with the latex is poor with a smaller velocity of crystallization after heat-sealing resulting in poor anti-blushing property and poor anti-blocking property. On the other hand, in the case where the content of vinylidene chloride is larger than 94% by weight, the velocity of crystallization is too large, and the film-forming ability cannot be retained for a long life with a poor processability of the latex.

As a monomer copolymerized with vinylidene chloride for making the layers (1), (2) and (3), at least one member selected from the group consisting of methyl acrylate, ethyl acrylate, propyl acrylate, butyl acrylate, octyl acrylate, methyl methacrylate, acrylonitrile, vinyl chloride, styrene, acrylic acid, methacrylic acid and itaconic acid is used. Among them, methyl acrylate, ethyl acrylate, butyl acrylate, acrylonitrile and acrylic acid are preferably used.

The diameter of the latex particle of the vinylidene chloride copolymer may be suitably selected. However, in the case where the diameter is too small, the thickness of the layer (2) becomes too small even if the weight ratio of the three layers is the same, and on the other hand, in the case where the diameter is too large, the thickness of the layer (2) becomes too large. Accordingly, the diameter of the latex particle according to the present invention is suitably of 800 to $2000 \times 10^{-8}$ cm.

The latex in which the copolymer particles assume the construction according to the present invention is usually obtainable by polymerization in an emulsified state of the monomer, however, it is preferable to adjust the emulsifier such as sodium dodecylbenzenesulfonate to prevent the formation of new particles of copolymer. The polymerization catalyst may be added in the emulsion polymerization. In addition, additives such as silica and wax may be added to the latex, and the latex may be processed to be coated following the conventional method.

The usefulness of the latex of the present invention will be explained in detail while referring to Examples and Comparative Examples as follows:

For reference, parts and percentage mean parts by weight and percentage by weight in the following description.

EXAMPLE 1

In the first place, in order to prepare the central core layer (1) of the copolymer particle, the following mixture was introduced into a glass ampoule after sufficiently substituting the interior thereof with nitrogen.

55.0 parts of vinylidene chloride (VD)
4.8 parts of methyl acrylate (MA)
0.2 parts of acrylic acid (AA)
70.0 parts of de-ionized water
0.35 parts of sodium dodecylbenzenesulfonate
0.02 parts of potassium persulfate, and
0.01 part of sodium hydrogen sulfite.

Then, the ampoule was shaken at a temperature of 45° C. for 40 hours to carry out the emulsion polymerization.

After opening the above-mentioned ampoule, the following mixture was introduced into the ampoule, and the emulsion polymerization was carried out again by shaking the sealed ampoule at 45° C. for 15 hours to prepare the layer (2) around the layer (1) prepared by the first step:

9.7 parts of vinylidene chloride (VD)
0.3 parts of methyl acrylate (MA)
12.0 parts of de-ionized water
0.01 part of potassium persulfate, and
0.005 parts of sodium hydrogen sulfite.

In the third step, after opening the above-mentioned ampoule, the following final mixture was introduced into the ampoule and the emulsion polymerization was carried out by shaking the sealed ampoule at 45° C. for 30 hours to prepare the layer (3), that is, the outer layer of the particle of vinylidene chloride copolymer.

26.9 parts of vinylidene chloride (VD)
3.0 parts of methyl acrylate (MA)
0.1 parts of acrylic acid (AA)
35.0 parts of de-ionized water
0.2 parts of sodium dodecylbenzenesulfonate
0.06 parts of potassium persulfate, and
0.03 parts of sodium hydrogen sulfite.

The overall conversion of the thus obtained latex was 99.2%. Microscopically determined mean diameter of the latex particle was about $1600 \times 10^{-8}$ cm. The thickness of the second layer (2) of the latex particle was calculated to be $35 \times 10^{-8}$ cm.

EXAMPLE 2

The same procedures as in Example 1 were carried out, except for the amount of sodium dodecylbenzenesulfonate of 1.0 part in the first polymerization instead of 0.35 parts in Example 1 and the amount of sodium dodecylbenzenesulfonate of 0.4 parts in the third polymerization instead of 0.20 parts in Example 1. The overall conversion of the thus obtained latex was 99.5% with the microscopically determined mean diameter of latex particle of about $900 \times 10^{-8}$ cm and the calculated thickness of the second layer (2) of $20 \times 10^{-8}$ cm.

EXAMPLE 3

The same procedures as in Example 1 were carried out, except for the respective amounts of introduced monomer mixtures of 65 parts and 5 parts in the first and the second polymerization without changing the composition of the monomer mixture instead of 60 and 30 parts, respectively in Example 1. The mean diameter of the latex particles thus obtained was $1550 \times 10^{-8}$ cm having a calculated thickness of the second layer of $18 \times 10^{-8}$ cm.

EXAMPLES 4 to 9

The same procedures as in Example 1 were carried out in the respective Examples 4 to 9, however, by changing the amount and/or the composition of monomer mixture as are shown in Table 1. The mean diameters of the latex particles and the calculated thicknesses of the second layers in Examples 4 to 9 are also shown in Table 1.

COMPARATIVE EXAMPLES 1 to 7

The same procedures were repeated as in Examples in Comparative Examples 1 to 7, except for altering the amount and/or composition of the monomer mixture in the first, second and/or third polymerization. The amount and composition of the monomer mixture, and the results are shown in Table 1.

COMPARATIVE EXAMPLE 8

After sufficiently substituting the interior of a stainless-steel autoclave with nitrogen, the following mixture was introduced into the autoclave and the emulsion polymerization was carried out at a temperature of 45° C. for 30 hours to prepare the core part (1) of the particle:

9.7 parts of vinylidene chloride (VD)
0.2 parts of methyl acrylate (MA)
0.1 part of acrylic acid (AA)
16.0 parts of de-ionized water
0.06 parts of sodium dodecylbenzenesulfonate
0.0016 parts of potassium persulfate, and
0.0008 parts of sodium hydrogen sulfite.

Then, the following mixture was introduced into the autoclave, and the content of the autoclave was stirred for 20 hours at 45° C.:

83.3 parts of vinylidene chloride (VD)
6.5 parts of methyl acrylate (MA)
0.45 parts of acrylic acid (AA)
88.2 parts of de-ionized water
0.665 parts of sodium dodecylbenzenesulfonate
0.01 part of potassium persulfate, and
0.005 parts of sodium hydrogen sulfite.

In the next step, the following mixture was introduced further into the autoclave, and the emulsion polymerization was carried out at 45° C. for 20 hours to form the outer layer (3) of the particle:

0.04 parts of potassium persulfate,
0.02 parts of sodium hydrogen sulfite and
5.5 parts of de-ionized water.

The properties of the latices thus obtained respectively in Examples 1 to 9 and in Comparative Examples 1 to 8 including the processability to form a coated film, the anti-blocking property and the life of film-forming ability, are also shown in Table 1. In addition, antiblushing property of the heat-sealed part of biaxially stretched polyamide film coated with the thus prepared latex against boiling treatment, and the oxygen permeability through the biaxially stretched polypropylene film coated with the latex thus prepared are also shown in Table 1.

The properties of the latices and the films coated with the respective latices shown in Table 1 were determined by the following methods:

(1) Processability of the latex in coating:

On the surface of a biaxially stretched polypropylene film of 20 microns in thickness, which has been subjected to oxidation treatment, a solution of a polyurethane adhesive in ethyl acetate is coated to give an amount of the adhesive of 0.3 g/m² with a Mayer-rod, and dried at 100° C. for 30 sec. After cooling naturally, a specimen of the latices of an adjusted surface tension of 40 dyne/cm at 20° C. is coated with the Mayer-rod to give an amount of the copolymer of 5 g/m² and is dried at 100° C. for 30 sec. After cooling naturally, the processability of the latex specimen in coating is evaluated by observing the presence or absence of the crack and touch of the coated surface, the transparency and the smoothness of the coated surface.

(2) Life of film-forming ability of the latex:

After keeping a specimen of the latices in a thermostat kept at a temperature of 20° C. for predetermined periods of time, the processability of the thus kept specimen is determined by the method described in (1). The retaining property of the film-forming ability is expressed by the time period of keeping the specimen at 20° C. until the coated film shows opaqueness or innumerable cracks on its surface, that is, the shelf life. The latex showed more than 3 months of the shelf life was evaluated to be practically good.

(3) Face-to-Back anti-blocking property:

On a biaxially stretched polypropylene film of 15 cm in width and 50 cm in length, a specimen of the latex is coated on one side of the film in the same manner as in (1). The thus coated film is immediately wound up on a pipe of polyvinyl chloride of one inch in diameter having a smooth surface under a tension of 2.5±0.2 kg, and the end of winding of the coated film is fixed with a cellophane adhesion tape, and then the whole material is kept at 40° C. for 4 hours.

Then, the wound coated film is slowly unwound to observe the degree of adhesion between the coated membrane of polyvinylidene chloride on the polypropylene film and the uncoated side of the polypropylene film, and the transcription of the unevenness of the surface of polypropylene film to the coated membrane of polyvinylidene chloride. The specimen which does not give any blocking nor any transcription is evaluated to be good.

In addition, for reference, into the specimen of the latices to be subjected to the above-mentioned test (3), 0.2 parts of powdery silica was added in advance per 100 parts of the solid matter in the latex.

(4) Oxygen permeability of the coated film:

The biaxially stretched polypropylene film coated with a specimen of the latices in the same manner as in (1) is subjected to an aging at 40° C. for 48 hours. After treating the thus aged film by boiling at 95° C. for 30 min, the thus treated film is immersed into cold water and its oxygen permeability is immediately measured using an oxygen permeability tester at a temperature of 20° C. and relative humidity of 90%.

(5) Anti-blushing property against boiling treatment:

The anti-blushing property, particularly at the heat-sealed part of the coated films is determined by using a biaxially stretched polyamide film coated with a specimen of the latices in the same manner as in (1) after aging for 48 hours at 40° C. The procedures of the determination are as follows: After heat-sealing the two coated surfaces of the films together for 3 sec under the pressure of 1.5 kg/cm² at the respective temperatures of 160°, 165°, 170°, 175° and 180° C., the specimen is immediately immersed into hot water at 95° C. for 30 minutes, and then left at 23° C. and a relative humidity of 50% for two hours to observe the degree of blushing of the heat-sealed part with naked eyes and by the method of Japanese Industrial Standard K-6714. The degree of blushing is expressed as "haze value (%)".

According to the method, in the case of haze value less than about 10%, blushing is not observed by naked eyes and the transparency of the heat-sealed part is good. In the case of haze value more than about 20%, the heat-sealed part is remarkably opaque showing blushing.

As is seen in Table 1, the results of anit-blushing property of the specimens obtained in Examples showed the haze value of less than 20%.

As seen in Table 1, the processability in preparing the coated film, anti-blocking property and the long life of film-forming ability of the latex prepared in Examples 1 to 9 and the oxygen permeability through the polypropylene film coated with the above-mentioned latex were practically favorable, and particularly the anti-blushing property against boiling treatment of the heat-sealed part of the coated film was remarkably excellent.

On the other hand, the properties of the latices prepared in Comparative Examples 1 to 8 were totally poor and unfavorable.

Comparative Example 1 gave a latex particle with the layer (2) of a thickness of $83 \times 10^{-8}$ cm. The latex particle was so hard that the processability to form the coated film was impaired with the results of giving a rough touch of the processed surface and the deteriorated transparency. The property of retaining the film-forming ability was especially worse. Althoug its anti-blushing property against boiling treatment was favorable, the originally impaired transparency gave an unfavorable evaluation as a whole.

Comparative Example 2 gave a latex particle with the layer (2) of a thickness of $8 \times 10^{31\ 8}$ cm by using a less amount of copolymer in the layer. Due to the too small thickness of the layer (2), its effectiveness as the crystal nucleus was insufficient resulting in the poor anti-blushing property against boiling treatment at the heat-sealed part of the coated film.

Comparative Example 3 gave a latex particle with the core layer of 75 parts of the whole weight of the particle, and accordingly, the latex was poor in processability of forming the coated film and short in the life of film-forming ability.

Comparative Example 4 gave a latex particle having the core layer consisting of 94.3% of vinylidene chloride. The crystallization of the copolymer was too fast and the latex particle became hard from the early stage after polymerization resulting in poor processability and short life of the film-forming ability.

Comparative Example 5 gave a latex particle of the layer (2) containing 93.8% of vinylidene chloride, which easily melted at the heating of heat-sealing. Accordingly, the anti-blushing property against boiling treatment is unfavorable because of the low melting point of the layer (2) resulting in poor anti-blushing at the heat-sealed part of the coated film.

Comparative Example 6 gave a latex particle having the core layer comprising 15 parts of the whole weight of the particle. Accordingly, the thickness of the layer (2) was so large that the life of the film-forming ability was short.

Comparative Example 7 was conducted to improve the defect of the latex obtained by Comparative Example 6 and for that purpose, the layer (2) was only 6 parts of the whole weight of the particle and the layer (3) comprising 89.7% of vinylidene chloride occupied 79 parts of the whole weight of the particle.

Contrary to the latex obtained in Comparative Example 6, the anti-blocking property and the anti-blushing property against boiling treatment of the latex obtained in Comparative Example 7 were poor as well as the poor gas-barrier property of the film coated with the latex.

Comparative Example 8 gave a latex particle having the crystal necleus rich in vinylidene chloride in the core layer. The hard crystal nucleus occupied more than 46% of the whole latex particle resulting in a poor processability of the latex and short life of the film-forming ability of the latex, thus causing several problems in practical use.

TABLE 1

Composition of Monomer Mixture and Properties of Latex and Coated Film

| | Composition of Monomer Mixture*1 | | | | | | | | | | Properties of Latex | | |
|---|---|---|---|---|---|---|---|---|---|---|---|---|---|
| | Layer (1) | | | Layer (2) | | | Layer (3) | | | | Latex particle | | |
| | Introduced amount (part) | Composition (%) | | Introduced amount (part) | Composition (%) | | Introduced amount (part) | Composition (%) | | | Thickness of layer (2) ($\times 10^{-8}$ cm)*2 | Diameter of particle ($\times 10^{-8}$ cm)*3 | Processability State of surface*4 |
| | | VD | comonomer | | VD | comonomer | | VD | comonomer | | | | |
| Examples of present invention | | | | | | | | | | | | | |
| | | | MA  AA | | | MA | | | MA  AA | | | | |
| 1 | 60 | 91.7 | 8.0  0.3 | 10 | 97.0 | 3.0 | 30 | 89.7 | 10  0.3 | | 35 | 1600 | Good |
| 2 | 60 | 91.7 | 8.0  0.3 | 10 | 97.0 | 3.0 | 30 | 89.7 | 10  0.3 | | 20 | 900 | Good |
| 3 | 65 | 91.7 | 8.0  0.3 | 5 | 97.0 | 3.0 | 30 | 89.7 | 10  0.3 | | 18 | 1550 | Good |
| | | | EA  AN | | | | | | | | | | |
| 4 | 55 | 92.0 | 3.1  4.9 | 8 | 97.0 | 3.0 | 37 | 89.3 | 10  0.7 | | 23 | 1200 | Good |
| | | | | | | MA  AN | | | | | | | |
| 5 | 55 | 92.0 | 3.1  4.9 | 8 | 96.0 | 2.0  2.0 | 37 | 89.3 | 10  0.7 | | 23 | 1200 | Good |
| | | | | | | | | | MA  AN  AA | | | | |
| 6 | 55 | 92.0 | 3.1  4.9 | 8 | 97.0 | 3.0  — | 37 | 92.0 | 3.7  4.0  0.3 | | 23 | 1200 | Good |
| | | | BA | | | | | | | | | | |
| 7 | 55 | 92.0 | 3.1  4.9 | 8 | 97.0 | 3.0  — | 37 | 89.3 | 10  —  0.7 | | 23 | 1200 | Good |
| | | | MA | | | | | | | | | | |
| 8 | 40 | 92.5 | 2.5  5.0 | 12 | 95.0 | 5.0  — | 48 | 92.0 | 7.7  —  0.3 | | 40 | 1200 | Good |
| 9 | 30 | 92.5 | 2.5  5.0 | 10 | 95.0 | 5.0  — | 60 | 89.3 | 10  —  0.3 | | 47 | 1400 | Good |
| Comparative Examples | | | | | | | | | | | | | |
| | | | AA | | | | | | | | | | |
| 1 | 60 | 91.7 | 8.0  0.3 | 25 | 97.0 | 3.0  — | 15 | 89.7 | 10  —  0.3 | | 83 | 1600 | Moderate |
| 2 | 60 | 91.7 | 8.0  0.3 | 2.5 | 97.0 | 3.0  — | 37.5 | 89.7 | 10  —  0.3 | | 8 | 1600 | Good |
| 3 | 75 | 91.7 | 8.0  0.3 | 17 | 97.0 | 3.0  — | 8 | 89.7 | 10  —  0.3 | | 48 | 1500 | Moderate |
| | | | EA  AN | | | | | | | | | | |
| 4 | 65 | 94.3 | 3.5  2.2 | 5 | 97.0 | 3.0  — | 30 | 89.7 | 10  —  0.3 | | 16 | 1400 | Poor |
| | | | MA  AA | | | | | | | | | | |
| 5 | 60 | 91.7 | 8.0  0.3 | 10 | 93.5 | 6.5  — | 30 | 89.7 | 10  —  0.3 | | 35 | 1600 | Good |
| | | | AN | | | | | | | | | | |
| 6 | 15 | 92.5 | 2.5  5.0 | 12 | 95.0 | 5.0  — | 73 | 92.0 | 7.7  —  0.3 | | 87 | 1500 | Moderate to Good |
| 7 | 15 | 92.5 | 2.5  5.0 | 6 | 95.0 | 5.0  — | 79 | 89.7 | 10  —  0.3 | | 48 | 1500 | Good |
| | | | AA | | | | | | | | | | |
| 8 | 10 | 97.0 | 2.0  1.0 | — | — | — | 90 | 92.3 | 7.2  —  0.5 | | — | — | Moderate |

| | Properties of Latex | | Properties of Coated Film | | | | | | |
|---|---|---|---|---|---|---|---|---|---|
| | | Life of film forming ability (month) | Judgement | Anti-blushing against boiling (haze value) | | | | Oxygen permeability (ml/m² 24 hours · atm) | Overall judgement |
| | | | | Temperature of heat-sealing (°C.) | | | Judgement | | |
| | Anti-blocking | | | 160 | 170 | 180 | | | |
| Examples of present invention | | | | | | | | | |
| 1 | Good | More than 3 | Good | 8.3 | 9.3 | 11 | Good | 17 | Good |
| 2 | Good | More than 3 | Good | 8.8 | 9.5 | 14 | Good | 18 | Good |
| 3 | Moderate to Good | More than 3 | Good | 9.6 | 10 | 16 | Good | 20 | Good |
| 4 | Good | More than 3 | Good | 9.0 | 9.8 | 13 | Good | 14 | Good |
| 5 | Good | More than 3 | Good | 9.4 | 10.0 | 15 | Good | 13 | Good |
| 6 | Good | More than 3 | Good | 9.1 | 10.0 | 18 | Good | 11 | Good |
| 7 | Good | More than 3 | Good | 9.8 | 11.0 | 14 | Good | 16 | Good |
| 8 | Good | 3 | Good | 9.2 | 11.0 | 18 | Good | 15 | Good |
| 9 | Moderate to Good | More than 3 | Good | 9.6 | 12 | 19 | Good | 22 | Good |
| Comparative Examples | | | | | | | | | |
| 1 | Good | Less than 1 | Poor | 14 | 15 | 19 | — | — | Poor |
| 2 | Moderate to Poor | Less than 3 | Poor | 18 | 31 | — | Poor | 23 | Poor |
| 3 | Good | Less than 1 | Poor | — | — | — | — | — | Poor |
| 4 | Good | Less than 1 | Poor | — | — | — | — | — | Poor |
| 5 | Good | More than 3 | Good | 17 | 37 | — | Poor | 16 | Poor |
| 6 | Good | 2 | Poor | 8.2 | 9.9 | 15 | Good | 27 | Poor |
| 7 | Moderate to Poor | More than 3 | Poor | 13 | 21 | 44 | Poor | 34 | Poor |

TABLE 1-continued

| Composition of Monomer Mixture and Properties of Latex and Coated Film |
|---|
| 8 | Good | 2 | Poor | 8.2 | 9.5 | 13 | Good | 26 | Poor |

Notes to Table 1:
*¹Composition of monomer mixture:
VD means vinylidene chloride
MA means methyl acrylate
EA means ethyl acrylate
BA means butyl acrylate
AN means acrylonitrile and
AA means acrylic acid
*²Thickness of the layer (2), calculated
*³Mean diameter of the latex particle, observed by electron microscope
*⁴Processability: expressed by the state of the surface, with naked eyes:
Good means no cracking, nor roughness and good transparency,
Moderate means the slight presence of cracking and roughness, and
Poor means the presence of cracking and roughness and opaqueness.
*⁵Anti-blocking property:
Good means no blocking,
Moderate means a slight blocking, and
Poor means remarkable blocking.

What is claimed is:

1. A latex of vinylidene chloride copolymer particle which has a three-layered structure comprising 20 to 70 parts by weight of a core layer of vinylidene chloride compolymer containing 85 to 94% by weight of vinylidene chloride, 3 to 15 parts by weight of an intermediate layer of vinylidene chloride copolymer containing more than 94% by weight of vinylidene chloride and 20 to 70 parts by weight of an outer layer of vinylidene chloride copolymer containing 85 to 94% by weight of vinylidene chloride, the three layers amounting to 100 parts by weight.

2. The latex of claim 1 wherein the particle is 800 to $2000 \times 10^{-8}$ cm in diameter.

3. The latex of claim 1 wherein the thickness of the intermediate layer is 10 to $50 \times 10^{-8}$ cm.

4. The latex of claim 3 wherein the thickness of the intermediate layer is preferably 15 to $40 \times 10^{-8}$ cm.

5. The latex of claim 1 wherein the copolymer is a copolymer of vinylidene chloride with at least one co-monomer selected from the group consisting of methyl acrylate, ethyl acrylate, propyl acrylate, butyl acrylate, octyl acrylate, methyl methacrylate, acrylonitrile, vinyl chloride, styrene, acrylic acid, methacrylic acid and itaconic acid.

* * * * *